US006531999B1

(12) United States Patent
Trajkovic

(10) Patent No.: US 6,531,999 B1
(45) Date of Patent: Mar. 11, 2003

(54) POINTING DIRECTION CALIBRATION IN VIDEO CONFERENCING AND OTHER CAMERA-BASED SYSTEM APPLICATIONS

(75) Inventor: Miroslav Trajkovic, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 125 days.

(21) Appl. No.: 09/615,879

(22) Filed: Jul. 13, 2000

(51) Int. Cl.$^7$ .............................. G09G 5/08; G06F 3/00
(52) U.S. Cl. ...................... 345/157; 345/162; 345/178
(58) Field of Search ................. 345/157, 863, 345/162, 178

(56) References Cited

U.S. PATENT DOCUMENTS 6,091,378 A * 7/2000 Richardson et al. ........... 345/7
6,353,764 B1 * 3/2002 Imagawa et al. ............. 700/1

FOREIGN PATENT DOCUMENTS

| DE | 19746864 A | 4/1999 | ............. G06F/3/03 |
| EP | 0571702 A2 | 12/1993 | ............. G06F/3/00 |
| EP | 0866419 A2 | 9/1998 | ............. G06K/11/08 |
| EP | 0913790 A1 | 5/1999 | ............. G06K/11/08 |
| WO | WO9717642 | 5/1997 | ............. G05D/23/00 |
| WO | WO9934276 | 7/1999 | ............. G06F/3/00 |

OTHER PUBLICATIONS

Masaaki Fukumoto et al; "Finger–Pointer: Pointing interface by image processing", Computers and graphics, Pergamon Press Ltd. Oxford, GB, vol. 18, No. 5, Sep. 1, 1994, pp. 633–642, XP000546603.

* cited by examiner

Primary Examiner—Steven Saras
Assistant Examiner—William C. Spencer
(74) Attorney, Agent, or Firm—Russell Gross

(57) ABSTRACT

A camera-based system implements a calibration procedure for determining, for a given system user, calibration information that characterizes the manner in which the user points within the system. The system directs the user to point separately at each point in a set of two or more points at different positions on a display. The system then detects, for each of the points pointed to by the user, a location of a pointing finger of the user in an image generated by each camera in a set of cameras of the system, such that for each of the points the location of the pointing finger and the corresponding point on the display specify a line. The lines associated with the points are then used to compute a reference point or other pointing direction calibration information for the user. The calibration information for the user may be stored with user-identifying information in a database of the system, and is utilized in subsequent pointing direction determinations for that user.

19 Claims, 2 Drawing Sheets

POINTING DIRECTION CALIBRATION IN VIDEO CONFERENCING AND OTHER CAMERA-BASED SYSTEM APPLICATIONS

FIELD OF THE INVENTION

The present invention relates generally to the field of image signal processing, and more particularly to calibration techniques for use in video conferencing and other camera-based system applications.

BACKGROUND OF THE INVENTION

In conventional video conferencing systems and other known camera-based systems, it may be desirable to determine, using image signal processing techniques, a direction in which a particular participant is pointing. For example, such a participant may be pointing at a white board or other presentation display, an object, or another local participant. In these and other cases the system can use the direction of pointing to bring the pointed-to display, object or participant into the field of view of a camera so as to be visible to remote participants.

A problem associated with the determination of pointing direction in video conferencing and other applications is that different people may have different ways of pointing. For example, some people may point in such a way that the direction of the user's arm will intersect with a desired target point. Others, however, may point using primarily a finger and a reference point such as a right or left eye. In the latter case, the direction of the arm may be insufficient to determine accurately where the person is pointing. Using the same model to characterize the pointing mechanism of all users can therefore introduce inaccuracies in the determination of pointing direction.

An example of a conventional camera-based system that involves determination of user pointing direction is described in European Patent Application No. EP 913790 A1, published May 6, 1999 and entitled "Hand Pointing Apparatus." This system processes images obtained from a set of video cameras oriented in different directions in order to determine a particular portion of a virtual three-dimensional space that is being pointing to by a user. However, this system and other similar conventional systems fail to provide a calibration technique for determining the manner in which a given user points. The system thus suffers from the above-noted inaccuracies that can arise when an assumption is made that all users point in the same manner.

It is therefore apparent that a need exists for a calibration technique that can determine the particular manner in which an individual user points, such that when that user is pointing at a display, an object or another user, the system can more accurately determine the pointing direction.

SUMMARY OF THE INVENTION

The invention provides a calibration technique that can be used to determine calibration information characterizing the manner in which an individual user points within a camera-based system. The resulting calibration information is used in a subsequent pointing direction determination, and ensures that the pointing direction determination is more accurate than would otherwise be possible without the calibration.

In accordance with the invention, a camera-based system directs the user to point separately at each point in a set of two or more points at different positions on a display. The points may be in the form of icons that are displayed sequentially or simultaneously at different positions on the display. The system then detects, for each of the points pointed to by the user, a location of a pointing finger of the user in an image generated by each camera in a set of cameras of the system, such that for each of the points the location of the pointing finger and the corresponding point on the display specify a line. The lines associated with the points are then used to compute a reference point or other pointing direction calibration information for the user. For example, the reference point may be determined as an intersection of the computed lines. The calibration information for the user may be stored with user-identifying information in a database of the system, and is utilized in subsequent pointing direction determinations for that user.

In an illustrative embodiment, the system includes at least two cameras, and determines the location of the pointing finger of the user in both an image generated by a first camera and an image generated by a second camera.

The techniques of the invention can be used in a wide variety of image processing applications, including camera-based systems such as video conferencing systems, video surveillance and monitoring systems, and human-machine interfaces. These and other features and advantages of the present invention will become more apparent from the accompanying drawings and the following detailed description.

DETAILED DESCRIPTION OF THE INVENTION

Figure 1:
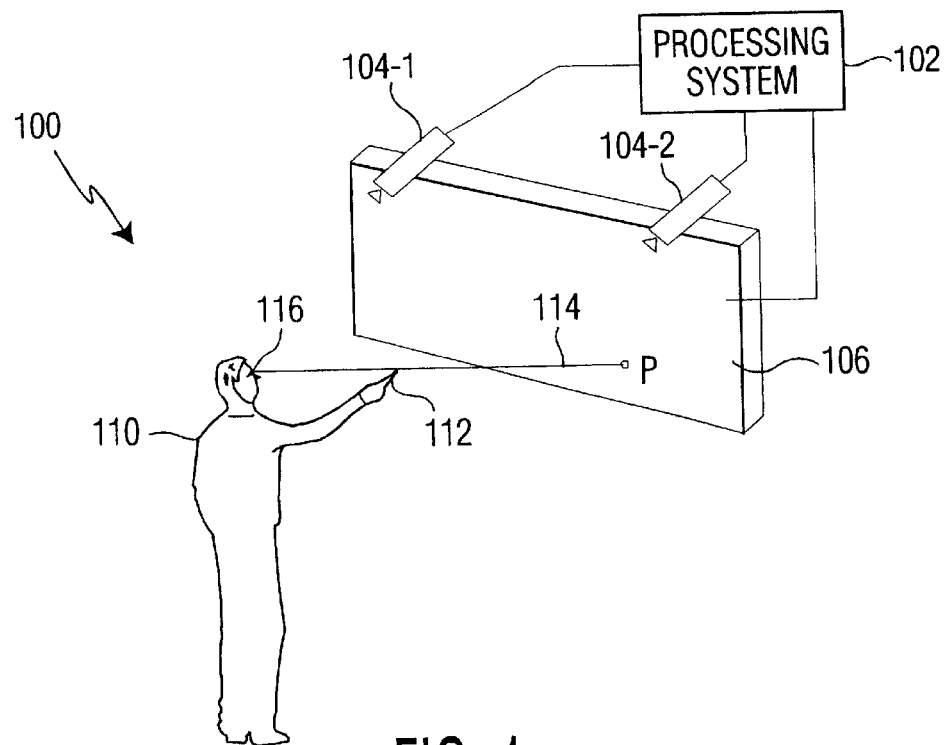
FIG. 1 shows an illustrative embodiment of a camera-based system with pointing direction calibration in accordance with the present invention.

FIG. 1 shows a camera-based system 100 in accordance with an illustrative embodiment of the invention. The camera-based system 100 comprises a processing system 102, a pair of cameras 104-1 and 104-2, and a screen-based display 106. The processing system 102 controls the cameras 104-1 and 104-2 and the display 106, as will be described in greater detail below.

The cameras 104-1 and 104-2 may each be, e.g., a pan-tilt-zoom (PTZ) camera, a zoom camera or any other suitable image capture device. The term "camera" as used herein is thus intended to include any type of image capture device.

A user 110 is shown in FIG. 1 as interacting with the system 100 by pointing a finger 112 toward a point P on a presentation screen of the display 106. A line 114 is shown between a reference point 116 on the user's head and the point P toward which the user is pointing with finger 112. As indicated in the figure, the tip of the finger 112 also lies on the reference line 114.

The present invention in the illustrative embodiment provides a "person pointing" calibration procedure that determines a unique reference point such as reference point 116 for each user of the system 100. The reference point corresponds generally to a unique point on or otherwise associated with the user, such as the user's left or right eye, a point between the eyes, any other point on the head, etc. Advantageously, the determined reference point for a given user provides a pointing direction calibration for that user and can be used to improve the accuracy of subsequent pointing direction determinations for that user.

The camera-based system 100 of FIG. 1 may be adapted for use in any of a number of different image processing applications, including, e.g., video conferencing, video surveillance, human-machine interfaces, etc. More generally, the system 100 can be used in any application that can benefit from the improved pointing direction determination capabilities provided by the present invention.

The processing system 102 of camera-based system 100 may be implemented as a computer, a set of computers, or any other arrangement of hardware, software or firmware elements capable of performing the person pointing calibration procedures described herein.

Figure 2:
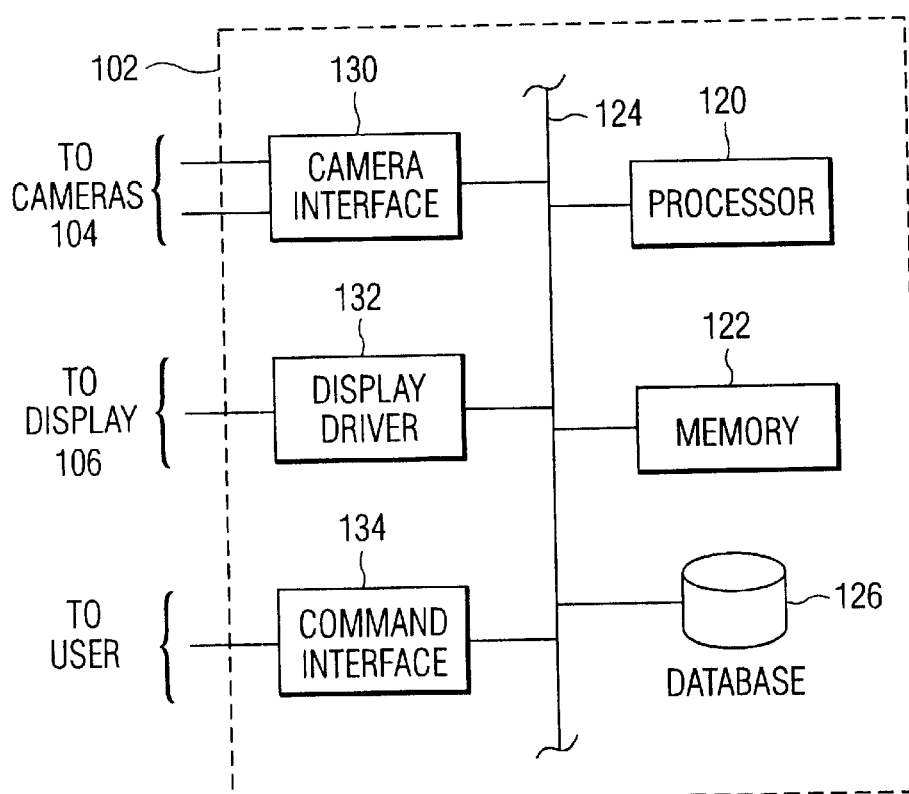
FIG. 2 is a block diagram of an example processing system that may be utilized in the camera-based system of FIG. 1.

FIG. 2 shows one possible implementation of the processing system 102. In this implementation, the processing system 102 includes a processor 120 and a memory 122 connected to communicate over a bus 124. Also coupled to the bus 124 are a database 126, a camera interface 130, a display driver 132 and a command interface 134.

The processor 120 executes software stored in memory 122 in order to implement the calibration procedure of the present invention. The processor 120 may represent, e.g., a microprocessor, central processing unit (CPU), microcontroller, digital signal processor (DSP), application-specific integrated circuit (ASIC), or other type of processing device, as well as portions or combinations of such devices.

The memory 122 may represent an electronic memory, an optical or magnetic disk-based memory, or a tape-based memory, as well as combinations or portions of these and other types of storage devices. The database 126 may be implemented in a similar manner and, although shown as a separate element in FIG. 2, may be implemented as part of the memory 122.

The camera interface 130 provides control signals to the cameras 104-1 and 104-2, such as pan, tilt or zoom control signals. The camera interface 130 also receives video signals from the cameras 104-1 and 104-2, and processes those signals so as to place them in a format suitable for further processing. For example, analog video signals from the cameras 104-1 and 104-2 may be converted in camera interface 130 to corresponding digital video signals.

The display driver 132 provides appropriate signals for presentation on the display 106, in response to commands or other signals received from the processor 120. For example, as will be described below in conjunction with the flow diagram of FIG. 3, the display driver 132 under the direction of the processor 120 may send signals to the display 106 such that different icons are presented in a particular sequence at different points on the display screen, so as direct the user through a calibration procedure.

The command interface 134 allows a user to supply input commands to the processing system 102 so as to direct the operation of the camera-based system 100 in a desired manner. The command interface 134 may also be utilized to present to the user suitable prompts for information required by the system. For example, the command interface 134 may include a speech generator which directs the user to take certain actions or to enter certain commands, and a corresponding speech detector which detects voice commands issued by the user. The command interface 134 could also be configured so as to communicate with a remote control device held by the user, such that the user can, e.g., enter commands on the remote control in response to prompts presented on the display screen. Other types of commands could also be used.

Elements or groups of elements of the processing system 102 may represent corresponding elements of an otherwise conventional desktop or portable computer, as well as portions or combinations of these and other processing devices. Moreover, in other embodiments of the invention, some or all of the functions of the processor 120, memory 122 or other elements of the processing system 102 may be combined into a single device. For example, one or more of the elements of processing system 102 may be implemented as an ASIC or circuit card to be incorporated into a computer, television, set-top box or other processing device.

Figure 3:
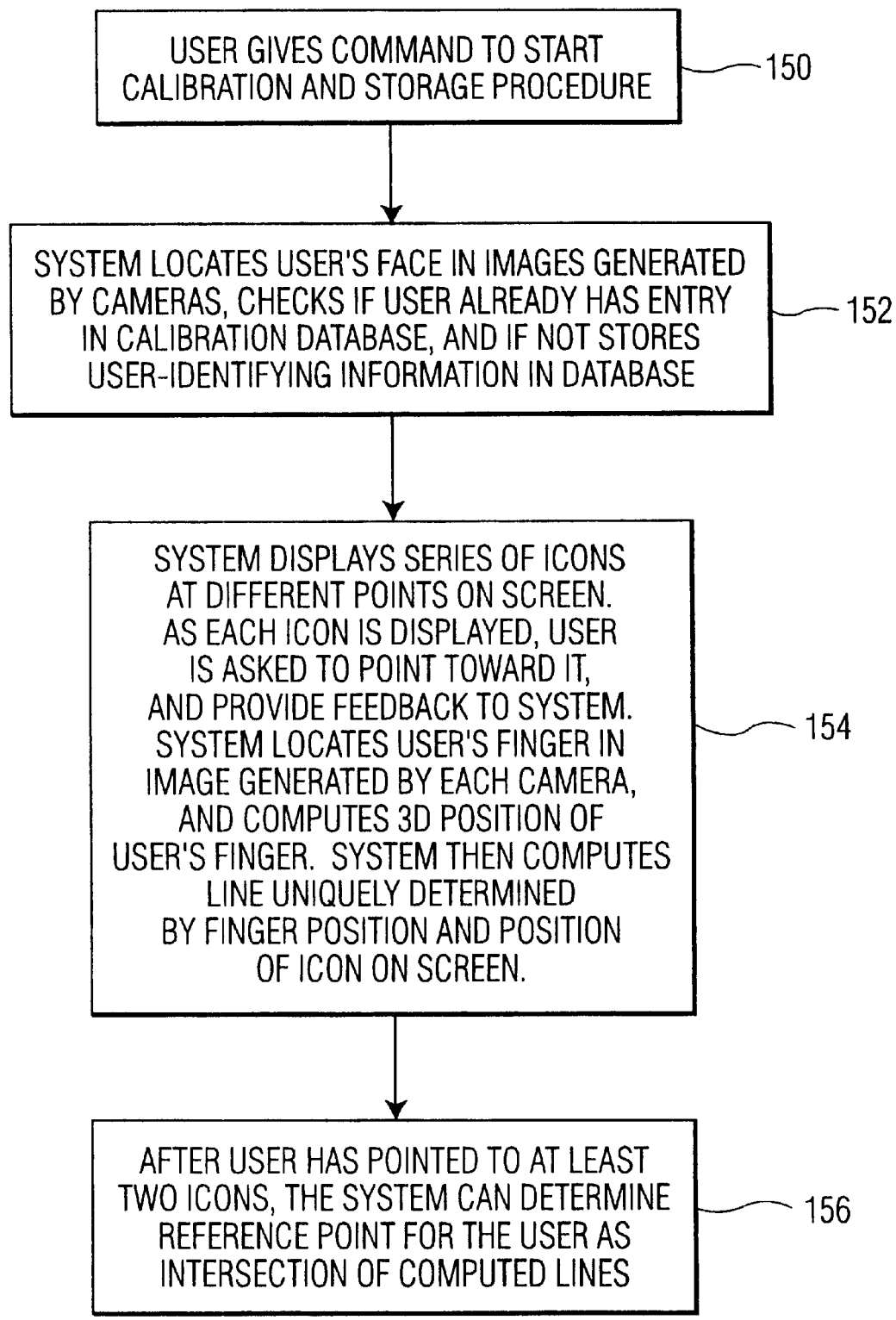
FIG. 3 is a flow diagram illustrating an example pointing direction calibration procedure in accordance with the invention.

FIG. 3 is a flow diagram of a person pointing calibration procedure in accordance with the illustrative embodiment of the invention. A given user in step 150 gives a command to the system to start a calibration and storage procedure, also referred to herein as simply a calibration procedure. For example, the user may enter such a command by voice, activation of a button on a remote control device, or by any other suitable mechanism. The command may be given in response to a system prompt presented to the user on the display screen or via an audibly-perceptible mechanism.

The system 100 in step 152 locates the user's face in one or more images generated by each of the cameras 104-1 and 104-2, and derives user-identifying information therefrom. This information may include certain facial characteristics of the user as derived from the images generated by the cameras 104-1 and 104-2, and may be supplemented by additional biometric information such as height, eye color or position, electromagnetic field, etc. Other devices not shown in FIGS. 1 and 2 but well known in the art may be used in the collection of this user-identifying information. In addition, numerous other types of techniques may be used to identify a given user to the system.

The system 100 then checks to determine if calibration information has already been stored for the identified user in a specified calibration database, e.g., the database 126 of processing system 102. In this case, it is not necessary to perform the calibration procedure for that user. The system 100 may thus be configured so as to recognize automatically whether a given user currently interfacing with the system has previously performed the calibration procedure. Alternatively, the command entered in step 150 could be in response to a prompt which directs the user to enter the calibration command only if the user has not already executed a calibration procedure with the system.

If calibration information has not been previously stored for the user, the user-identifying information is stored in the database 126 of processing system 102. The database 126 may thus include sets of stored user-identifying information for each of the users of the system 100. The calibration information generated as a result of the FIG. 3 process for a given user will be stored along with the identifying information for that user.

The system 100 in step 154 displays a series of icons to the user via the display screen of display 106. Each of the icons corresponds to a different point on the screen, and the icons may be displayed one at a time or as a group. For example, there may be a total of five icons, with one at the center of the display screen, and one at each corner of the display screen. Numerous other arrangements of icons could also be used.

For each displayed icon, the user is directed to point to that icon, and then to provide feedback to the system indicating that he or she is currently pointing at the designated icon. For example, the system may highlight or otherwise display a particular icon on the display screen in conjunction with instructions directing the user to point to that icon. As another example, the instructions may be presented as generated speech output. The user can provide feedback to the system using voice commands or other appropriate input mechanisms such as activating a button on a remote control device.

Also as shown in step 154, for each of the icons the system 100 locates the user's pointing finger in the images generated by the cameras 104-1 and 104-2. Conventional image processing techniques may be used to locate the pointing finger. These techniques are well understood in the art and are therefore not described in detail herein. Once the pointing finger is located in an image generated by each of the cameras 104-1 and 104-2, the system computes the three-dimensional (3D) position of the pointing finger, using its knowledge of the position of the plane of the display screen, the positions of the cameras, the focal lengths of the cameras, etc. The system then computes from the 3D position of the pointing finger a line which is uniquely determined by the 3D finger position and the known position of the corresponding icon on the display screen. An example of such a line is the line 114 along which the user 110 points toward point P in FIG. 1.

Step 156 indicates that after the user has pointed to at least two displayed icons, the system can determine the desired reference point for the particular user as an intersection of the computed lines. More particularly, for each of the displayed icons, the system determines a corresponding computed line as described in step 154. The intersection of these computed lines provides the desired user-specific reference point described previously in conjunction with FIG. 1. This reference point is then stored in the database 126 with the corresponding user-identifying information stored in step 152. Although the calibration information can be generated using only two icons, it will be preferable in many applications to utilize more than two icons in order to increase the accuracy of the calibration.

The reference point determined for a given user in certain applications can be verified by, e.g., processing images generated by the cameras 104 to determine a line of symmetry of the user, and checking that the reference point falls on or near the line of symmetry. It should be understood, however, that this type of verification is not a requirement of the present invention.

As previously noted, the reference point determined for a given user in the manner illustrated in FIG. 3 provides a calibration to be utilized in subsequent pointing direction determinations for the given user. For example, if the user 110 completes the above-described procedure, and is subsequently pointing to a point P on the display screen as shown in FIG. 1, the system retrieves as calibration information the previously-stored reference point 116, and utilizes that reference point and detection of the finger 112 to determine the line 114 which identifies the point P toward which the user is pointing. The use of the calibration procedure of the present invention ensures that the pointing direction determination is accurate for each user of the system.

The above-described embodiments of the invention are intended to be illustrative only. For example, the particular types and arrangements of system elements shown in FIGS. 1 and 2 are by way of example only, and numerous alternative system configurations can be used to implement the person pointing calibration techniques of the invention. In addition, although the calibration points in the illustrative embodiment are presented as icons on a display, other embodiments could use different types of points at other positions in the system, e.g., points on a wall adjacent the display, etc. Furthermore, as previously noted, the invention can be implemented at least in part in the form of one or more software programs which are stored on an electronic, magnetic or optical storage medium and executed by a processing device, e.g., by the processor 120 of processing system 102. These and numerous other embodiments within the scope of the following claims will be apparent to those skilled in the art.

What is claimed is:

1. A method of performing a calibration of a pointing direction for a user in a camera-based system, the method comprising the steps of:

directing the user to point separately at each point in a set of two or more points at different positions in the system;

detecting for each of the points pointed to by the user a location of a pointing finger of the user in an image generated by each of one or more cameras of the system, such that for each of the points the location of the pointing finger and the corresponding point specify a line;

computing pointing direction calibration information for the user based at least in part on the lines associated with the two or more points; and determining a line of symmetry of the user in two or more images generated by cameras of the system, and verifying the calibration information by determining if a relationship between the calibration information and the line of symmetry of the user meets a specified criterion.

2. The method of claim 1 wherein the system comprises at least two cameras, and the detecting step comprises determining the location of the pointing finger of the user in both an image generated by a first camera and an image generated by a second camera.

3. The method of claim 1 further comprising the steps of determining user-identifying information for the user, and storing the calibration information for the user in association with the user-identifying information.

4. The method of claim 1 wherein the computing step includes determining the calibration information for the user at least in part as an intersection of the lines associated with the two or more points.

5. The method of claim 1 wherein the calibration information comprises a reference point associated with the user.

6. The method of claim 5 wherein the reference point comprises a point on or near a head of the user.

7. The method of claim 1 wherein at least a subset of the points comprise icons presented on a display of the system.

8. The method of claim 7 wherein only a single one of the icons is presented on the display at a given point in time.

9. The method of claim 7 wherein at least a subset of the icons are presented simultaneously on the display.

10. An apparatus for use in performing a calibration of a pointing direction for a user in a camera-based system, the apparatus comprising:

a plurality of cameras; and a processing system coupled to the plurality of cameras, the processing system being operative: (i) to direct the user to point separately at each point in a set of two or more points at different positions in the camera-based system; (ii) to detect for each of the points pointed to by the user a location of a pointing finger of the user in an image generated by each of at least a subset of the plurality of cameras, such that for each of the points the location of the pointing finger and the corresponding point specify a line; (iii) to compute pointing direction calibration information for the user based at least in part on the lines associated with the two or more points; and (iv) to determine a line of symmetry of the user in two or more images generated by the cameras, and to verify the calibration information by determining if a relationship between the calibration information and the line of symmetry of the user meets a specified criterion.

11. The apparatus of claim 10 wherein the processing system determines the location of the pointing finger of the user in both an image generated by a first one of the cameras and an image generated by a second one of the cameras.

12. The apparatus of claim 10 wherein the processing system is further operative to determine user-identifying information for the user, and to store the calibration information for the user in association with the user-identifying information.

13. The apparatus of claim 10 wherein the processing system determines the calibration information for the user at least in part as an intersection of the lines associated with the two or more points.

14. The apparatus of claim 10 wherein the calibration information comprises a reference point associated with the user.

15. The apparatus of claim 14 wherein the reference point comprises a point on or near a head of the user.

16. The apparatus of claim 10 wherein at least a subset of the points comprise icons presented on a display of the camera-based system.

17. The apparatus of claim 16 wherein only a single one of the icons is presented on the display at a given point in time.

18. The apparatus of claim 16 wherein at least a subset of the icons are presented simultaneously on the display.

19. An article of manufacture comprising a storage medium for storing one or more programs for use in performing a calibration of a pointing direction for a user in a camera-based system, wherein the one or more programs when executed by a processor implement the steps of:

directing the user to point separately at each point in a set of two or more points at different positions in the system;

detecting for each of the points pointed to by the user a location of a pointing finger of the user in an image generated by each of one or more cameras of the system, such that for each of the points the location of the pointing finger and the corresponding point specify a line;

computing pointing direction calibration information for the user based at least in part on the lines associated with the two or more points; and determining a line of symmetry of the user in two or more images generated by cameras of the system, and verifying the calibration information by determining if a relationship between the calibration information and the line of symmetry of the user meets a specified criterion.

* * * * *